J. M. HARPER.
NUT DISH.
APPLICATION FILED MAY 7, 1914.

1,138,288.

Patented May 4, 1915.

Witnesses:
John Enders
M. H. Holmes.

Inventor:
James M. Harper,
by Robert Burns
Atty.

UNITED STATES PATENT OFFICE.

JAMES M. HARPER, OF CHICAGO, ILLINOIS, ASSIGNOR TO HARPER SUPPLY COMPANY, OF CHICAGO, ILLINOIS, A CORPORATION OF ILLINOIS.

NUT-DISH.

1,138,288.      Specification of Letters Patent.      Patented May 4, 1915.

Application filed May 7, 1914. Serial No. 836,875.

*To all whom it may concern:*

Be it known that I, JAMES M. HARPER, a citizen of the United States of America, and a resident of Chicago, in the county of Cook, State of Illinois, have invented certain new and useful Improvements in Nut-Dishes, of which the following is a specification.

This invention relates to a household dish for use in eating cracked edible nuts, and has for its object to provide a simple and efficient structural formation of a dish, and provide separate compartments for the cracked nuts and for the picked shells and a convenient holder for the individual nut pick used in the operation, all as will hereinafter more fully appear.

Figure 1:
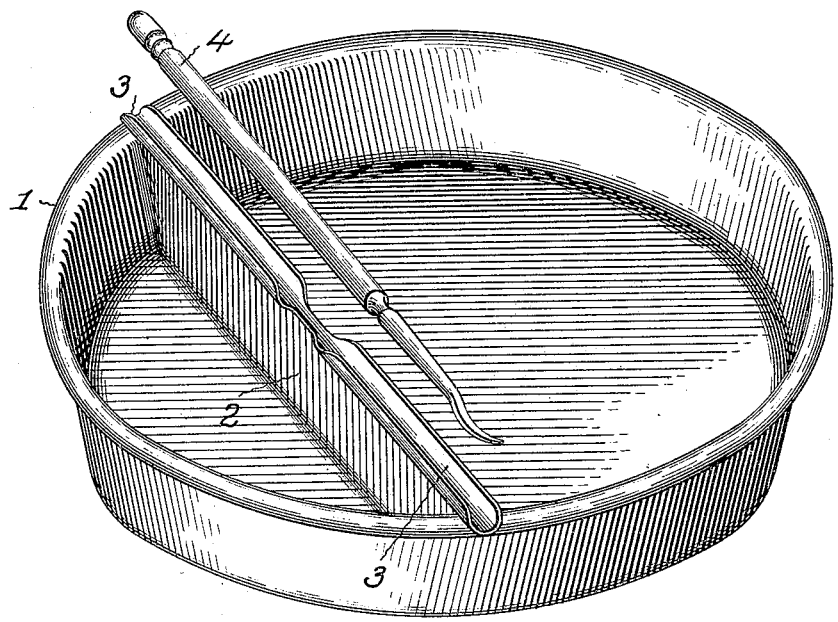
Figure 2:
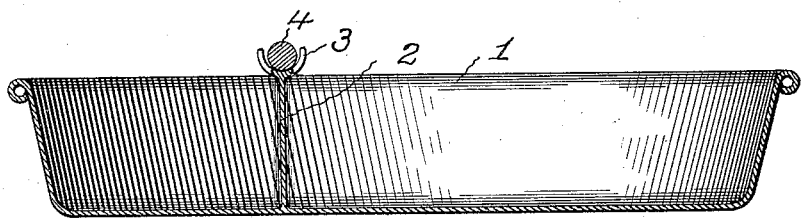

In the accompanying drawing: Figure 1, is a perspective view of the present nut dish, the individual nut pick being shown a distance above its holder. Fig. 2, is a transverse section.

Similar reference numerals indicate like parts in both views.

Referring to the drawings: 1 represents an open-top dish of any ordinary form and material, and which in the present improvement is provided with a vertical transversely extending partition 2, dividing the cavity of the dish into a pair of compartments, one of which is preferably of a larger capacity than the other and adapted to receive the picked shells after the kernels are removed. The smaller compartment is intended to hold a supply of cracked nuts.

The material part of the present improvement involves the provision at the upper edge of the partition 2, of an open top or trough shape holder or receiver 3 for the convenient holding of an individual nut pick 4. And in the preferred form of the holder 3, its side members will be cut-away at their mid length so that the fingers of the user may readily grasp and remove the pick from said holder, and in like manner replace the pick after use.

Having thus fully described my said invention what I claim as new and desire to secure by Letters Patent, is:

1. A household nut dish of the type described, comprising an open top dish having a transverse partition dividing the same into a pair of compartments, and means on the upper edge of said partition for holding a nut-pick, substantially as set forth.

2. A household nut dish of the type described, comprising an open top dish having a transverse partition dividing the same into a pair of compartments, the upper edge of said partition carrying a trough shaped holder for a nut-pick, substantially as set forth.

3. A household nut dish of the type described, comprising an open top dish having a transverse partition dividing the same into a pair of compartments, the upper edge of said partition carrying a trough shaped holder the side walls of which are cut away midway their length, substantially as set forth.

Signed at Chicago, Illinois, this 2nd day of May, 1914.

JAMES M. HARPER.

Witnesses:
  ROBERT BURNS,
  IVA L. CRANE.

Copies of this patent may be obtained for five cents each, by addressing the "Commissioner of Patents, Washington, D. C."